(12) United States Patent
Chapman et al.

(10) Patent No.: US 6,278,463 B1
(45) Date of Patent: *Aug. 21, 2001

(54) DIGITAL IMAGE PROCESSING

(75) Inventors: Sydney George Chapman; Brian Michael Collins, both of Winchester (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,603

(22) Filed: Jul. 6, 1999

(30) Foreign Application Priority Data

Apr. 8, 1999 (GB) .................................. 9907898

(51) Int. Cl.[7] ..................................... G06T 11/80
(52) U.S. Cl. ................ 345/435; 345/442; 345/431; 345/432; 345/136; 345/138
(58) Field of Search .................... 345/435, 431, 345/136, 138, 432, 442, 443

(56) References Cited

U.S. PATENT DOCUMENTS

| 4,212,009 | * | 7/1980 | Adleman et al. | 340/728 |
|---|---|---|---|---|
| 5,020,119 | * | 5/1991 | Tai et al. | 382/50 |
| 5,428,723 | * | 6/1995 | Ainscow et al. | 395/135 |
| 5,706,417 | * | 1/1998 | Adelson | 395/129 |
| 5,754,186 | * | 5/1998 | Tam et al. | 345/435 |
| 5,936,606 | * | 8/1999 | Lie | 345/113 |

FOREIGN PATENT DOCUMENTS

| 2 067 873 | 7/1981 | (GB) . |
|---|---|---|
| 2 137 041 | 9/1984 | (GB) . |

OTHER PUBLICATIONS

Giordan On Graphics: http://www.webreference.com/graphics/col.1: Daniel Giordan, Mecklermedia Corporation, 1998.*

* cited by examiner

Primary Examiner—Mark Zimmerman
Assistant Examiner—Mano Padmanabhan
(74) Attorney, Agent, or Firm—Scully, Scott, Murphy & Presser; Louis P. Herzberg (57) ABSTRACT

Methods and apparatus are provided for processing digital image data representing first and second images I1 and I2 with overlapping image content to produce digital image data representing a composite image I3 spanning the overlap region O. The method comprises processing image data which corresponds to the overlap region in the first and second images I1 and I2 such that the proportions of first image data and second image data contributing to the overlap region O in the composite image I3 vary along the length L of the overlap region O. Preferred methods include defining a non-straight line J extending along the length of the overlap region O, and performing said processing by reference to said non-straight line J such that the ratio of the proportions of first and second image data contributing to the overlap region O varies for different sections S of the overlap region O along the length L thereof.

17 Claims, 5 Drawing Sheets

DIGITAL IMAGE PROCESSING

FIELD OF THE INVENTION

The present invention relates generally to digital image processing systems for joining together digital images to produce a composite image. Embodiments of the present invention provide methods and apparatus for processing digital image data to produce digital image data representing such a composite image.

BACKGROUND OF THE INVENTION

Systems for joining two or more digital images to produce a composite digital image are known. Joining of images in this way may be required for a variety of reasons, but it is usually performed to obtain a larger field of view in the composite image. Generally, each pair of adjacent images to be joined to produce the composite image will have a region of overlapping image content. Such images can be acquired, for example, by separate cameras with overlapping fields of view, or, for stationary scenes, by shifting the field of view of a single camera between image acquisitions. However acquired, there will almost always be differences in image quality, such as color or brightness differences, between the individual component images, and these differences tend to accentuate the joins in the composite image. Prior known systems attempt to reduce the visibility of the join between two component images by processing image data from the overlap region such that pixels from both of the component images are combined in some way to produce the overlap region in the composite image. For example, each pixel in the overlap region of the composite image might be produced by averaging the corresponding pixels in the two component images. Alternatively, a more complex filtering process might be performed across the overlap region to generate the composite image pixels from the component image pixels. One common technique is to implement a gradual transition between the two component images by gradually ramping down the luminance level of one image signal across the overlap region and gradually ramping up the luminance level of the other signal across this region, the two image signals then being summed to produce the composite image signal. This produces a gradual fade from one image to the other across a straight-sided band corresponding to the overlap region.

While these known systems can reduce the visibility of the join to some extent, the resulting band in the composite image across which the processing has been performed can still be quite noticeable to the viewer. Moreover, the processing operations performed to obtain this band are relatively computationally intensive, involving floating point calculations, and this in turn limits processing speed. This can make implementation in real-time video applications more difficult, particularly in the case of high resolution video.

DISCLOSURE OF THE INVENTION

According to the present invention there is provided a method for processing digital image data representing first and second images with overlapping image content to produce digital image data representing a composite image spanning the overlap region, the method comprising processing image data which corresponds to the overlap region in the first and second images to produce image data representing the overlap region in the composite image such that the proportions of first image data and second image data contributing to the overlap region in the composite image vary along the length of the overlap region.

In embodiments of the present invention, therefore, data from the first and second images are combined to produce the overlap region in the composite image, but in proportions which vary along the length of the overlap region, i.e. in a direction perpendicular to the direction of increasing overlap. In the prior systems mentioned above, the relative contributions of first and second image data to the overlap region in the composite image are either uniform throughout the overlap region or vary only in a direction across the overlap region, i.e. perpendicular to its length. This lack of variation in the length direction means that there are straight-line boundaries between the different regions of the composite image down the whole length of the overlap region. Since the human psychovisual system is particularly sensitive to long straight lines, the join in the composite image is often still quite noticeable in these prior systems in spite of the relatively complex processing. In contrast, by varying the relative proportions of first and second image data along the length of the overlap region in embodiments of the present invention, the appearance of these straight-line boundaries can be reduced or eliminated, with the result that the join appears far less noticeable to the viewer. In other embodiments, results which are similar to or better than those obtained with prior systems can be achieved by a simpler processing operation, enabling equivalent or better image quality to be achieved with significantly improved processing speeds.

Preferred methods embodying the invention include defining a non-straight line extending along the length of the overlap region, and performing said processing by reference to said non-straight line such that the ratio of the proportions of first and second image data contributing to the overlap region varies for different sections of the overlap region along the length thereof. Various ways in which the processing can be performed by reference to said non-straight line will be described below, but the underlying idea is to generate pixels in the overlap region of the composite image in different ways depending on their location relative to this line to achieve the variation in said ratio. In particularly preferred methods, the ratio of the proportions of first and second image data contributing to the overlap region on one side of said line is 1:0, and the ratio of said proportions contributing to the overlap region on the other side of said line is 0:1. Thus, in the overlap region of the composite image, the image portion on one side of the line is made up solely of first image pixels, and the image portion on the other side of the line is made up solely of second image pixels. In a particularly simple case where the line divides the overlap region into discrete sections corresponding to image portions on alternate sides of the line along the length of the overlap region, the ratio of said proportions is preferably alternately 1:0 and 0:1 for successive sections along the overlap region. Again, therefore, portions of the overlap region in the composite image are made up solely of either first or second image pixels. These embodiments provide extremely simple methods for joining images since each composite image pixel is either a first or second image pixel, and averaging, filtering or other processing involving multiplication and summation of pixel values is not required. However, because the boundary between first and second image pixels along the length of the overlap region is a non-straight line, the join can be far less noticeable in the composite image. If the scale is small enough so that the eye cannot resolve the individual sections of first and second image pixels, then the apparent effect will be a merging of the first and second images across the join line, with the eye effectively performing an averaging process. Here, results which are as least as good as prior averaging systems can be achieved with a simple, high speed processing operation which does not involve floating point calculations. Alternatively, if the scale is such that the sections can be resolved by the eye, it may be desirable, depending on the requirements of a particular application, to generate composite image pixels in a band of pixels axially disposed about the join line by combining proportions of first and second image pixels in accordance with an averaging, filtering, or ramping process. While this would necessitate floating point calculations and thus increase processing complexity, very high quality results can be achieved since the resulting band of processed pixels has non straight-line boundaries which are far less noticeable to the viewer.

The images processed by methods embodying the invention may be fields or frames of video signals, and successive pairs of frames of the video signals may be processed in real-time to generate video data representing a composite moving image. Indeed, in preferred embodiments of the invention the processing speed can be sufficiently high that the frames of a video signal can be processed in real time as a succession of still images in the same way as any other type of image.

Digital images are often represented by signal formats with more than one channel, where each channel represents a different component of the complete image. For example, there is one red, one green and one blue channel to represent a digital image in the RGB system. In the HSB system there is one channel representing hue (H), one channel representing saturation (S), and one channel representing brightness, or luminance, (B). In the YCrCb system there is one luminance channel (Y) and two chrominance channels (Cr and Cb). Since the human psychovisual system is more sensitive to some channels than others, the different channels may be processed differently in embodiments of the present invention. For example, the eye is generally more sensitive to luminance than other image characteristics. Thus, the Y channel in the YCrCb system (or the B channel in the HSB system) may be processed by a method as described above, and data corresponding to the other channels of the first and second images may simply be joined directly along a straight line boundary in the composite image.

It will of course be appreciated that embodiments of the invention may be applied where three or more component images are to be joined to produce a composite image. In such cases, each component image will have overlapping image content with at least one other component image, and for each overlap region the corresponding pair of images can be processed by a method embodying the invention.

The present invention also provides digital image processing apparatus configured to perform a method as described above. In particular, a further aspect of the present invention provides apparatus for processing digital image data representing first and second images with overlapping image content to produce digital image data representing a composite image spanning the overlap region, the apparatus comprising processing means configured to process image data which corresponds to the overlap region in the first and second images to produce image data representing the overlap region in the composite image such that the proportions of first image data and second image data contributing to the overlap region in the composite image vary along the length of the overlap region.

A further aspect of the present invention provides a computer program product comprising a computer readable medium having recorded thereon a computer program which, when loaded in a personal computer, configures the computer for processing digital image data by a method as described above.

In general, it is to be understood that where features are described herein with reference to a method embodying the invention, corresponding features may be provided in apparatus embodying the invention, and vice versa.

BRIEF DESCRIPTION OF THE DRAWINGS

Embodiments of the invention will now be described, by way of example, with reference to the accompanying drawings in which.

DESCRIPTION OF THE PREFERRED EMBODIMENTS

Figure 1A:
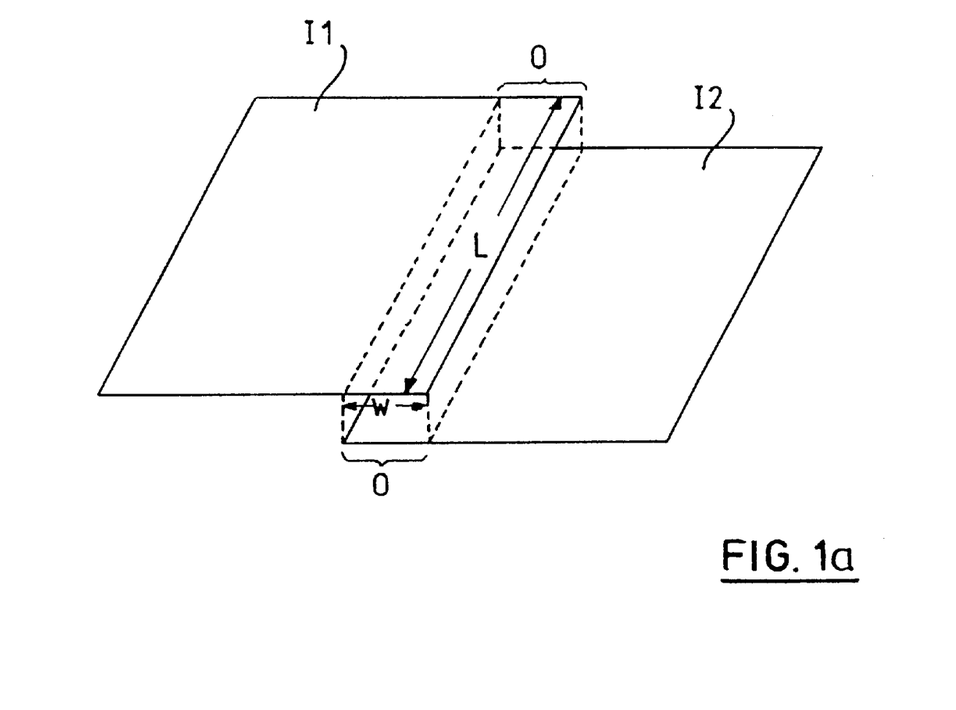
FIG. 1a is a schematic illustration of a pair of images with overlapping image content which are to be processed to produce a composite image illustrated schematically in FIG. 1b.
Figure 1B:
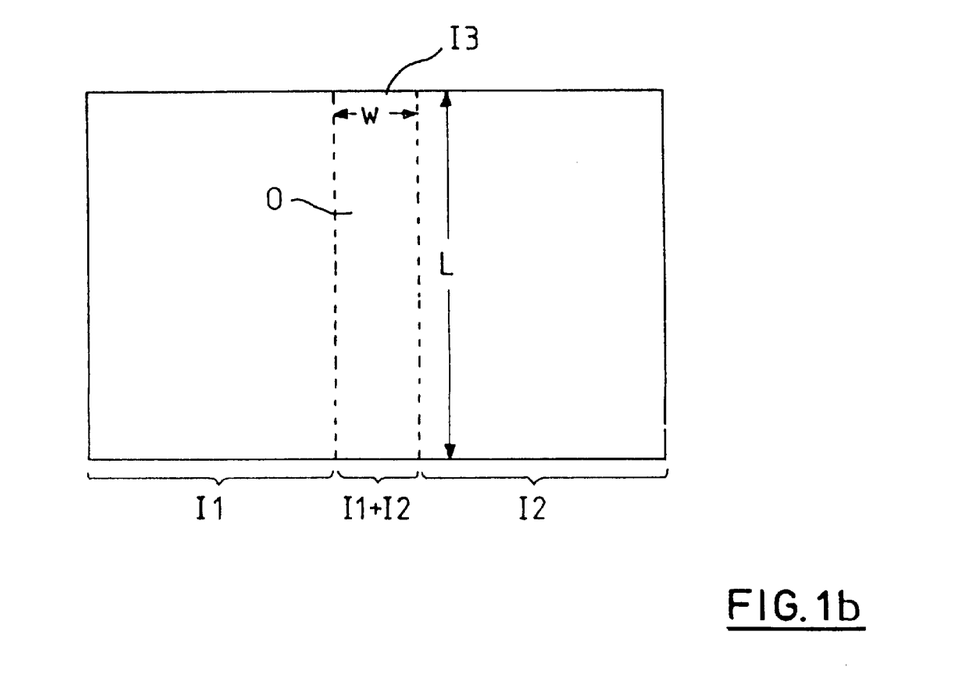

FIG. 1a shows a pair of digital images I1 and I2 with overlapping image content indicated by an overlap region O. The overlap region O has a width w in the direction of overlap, and a length L in a direction perpendicular to the direction of overlap. In embodiments of the present invention the digital image data representing the images I1 and I2 is processed to generate digital image data representing a composite image I3 as shown in FIG. 1b. The image I3 in this example covers the image content of both I1 and I2 and therefore spans the overlap region O. To the left of the overlap region O in FIG. 1b, the I3 data is simply the corresponding I1 data. Similarly, the I3 data to the right of the overlap region is the corresponding I2 data. The overlap region O in the composite image is generated using I1 and I2 data corresponding to the overlap region in proportions which vary along the length L of the overlap region. This can be done in various ways depending on the particular requirements of a given application to achieve low visibility of the join in the composite image and also, where desired, high processing speeds due to the simplicity of the processing operation.

Figure 2A:
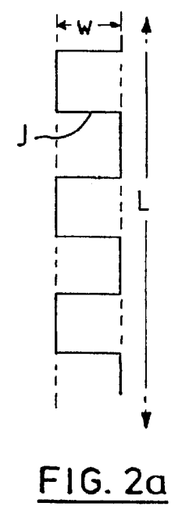
FIGS. 2a, 2b and 2c illustrate examples of different forms of non-straight line which may be used in processing systems embodying the invention.
Figure 2B:
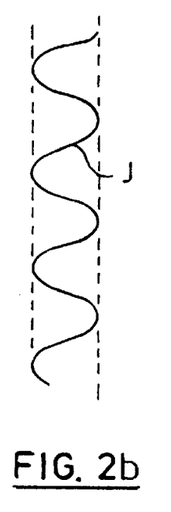
Figure 2C:
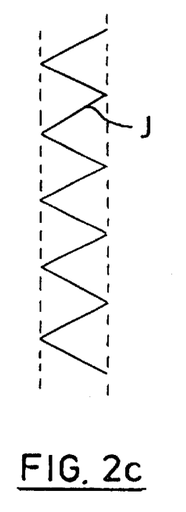

As one example, corresponding pixels in I1 and I2 could be combined in proportions which are varied randomly throughout the overlap region. Thus, for example, at one pixel position in the overlap region the I1 and I2 pixels could be combined in the ratio 1:1 to produce the I3 pixel. That is, ¢ the I1 pixel value and ¢ the I2 pixel value are summed to produce the I3 pixel value. At another pixel position the ratio could be 1:3 (i.e. _ of the I1 pixel value and ¥ of the I2 pixel value), and so on, the ratio being varied randomly between 0:1 and 1:0 for different pixels, or groups of pixels, throughout the overlap region. This would have the effect of merging I1 and I2 over the overlap region in I3, and because the proportions of I1 and I2 pixels are varied along the length L as well as the width w of the overlap region, the visibility of the join would be less perceptible than prior systems. To simplify the processing operation, however, preferred methods involve defining a non-straight line extending along the length of the overlap region O, and processing the image data by reference to this line such that the ratio of the contributions of I1 and I2 data varies for different sections along the length of the overlap region. FIGS. 2a to 2c show examples of such lines which divide the overlap region (a portion of which is indicated by the broken lines) into discrete sections along its length.

In FIG. 2a, the dividing line J is in the form of a rectangular waveform, in FIG. 2b the line J is a sinusoidal waveform, and in FIG. 2c the line J is a sawtooth waveform. These figures provide examples of lines which divide the overlap region O into discrete, similarly-sized sections, successive sections along the length L of the overlap region being on alternate sides of the line J. While these types of lines allow the processing operation to be simplified, irregular waveforms, or lines which do not divide the overlap region into discrete sections, could be used if desired, and examples of these will be given below. Other examples of regular waveforms like those of FIGS. 2a to 2c will also be apparent.

Figure 3:
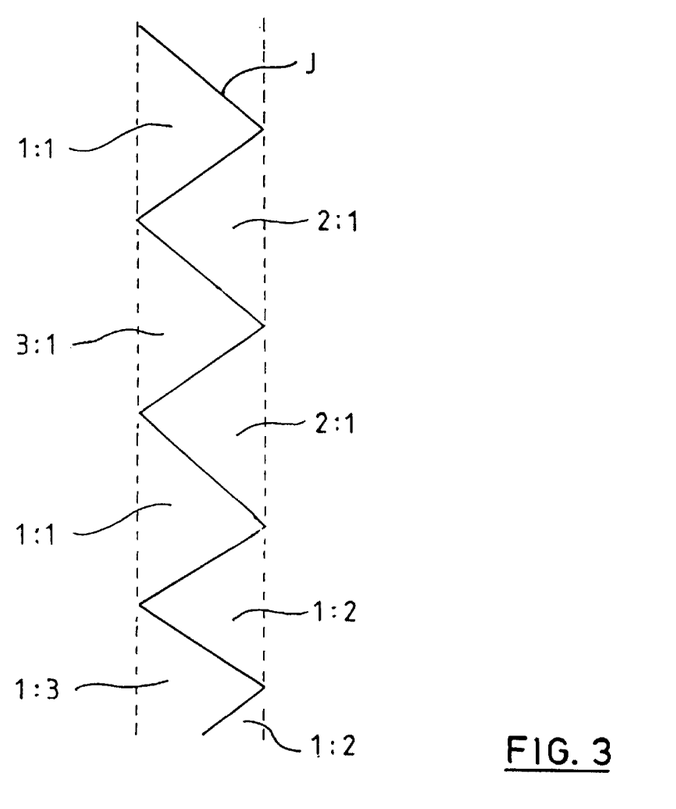
FIG. 3 illustrates, for the example of FIG. 2c, one way in which the proportions of data from the two component images can be varied in different sections of the overlap region of the composite image.

The proportional contributions of I1 and I2 data to the different sections of the overlap region O can be varied in a number of ways. One example is illustrated in FIG. 3 for the case of the sawtooth waveform of FIG. 2c. Here, I3 pixels in the top section are generated by combining the corresponding I1 and I2 pixels in the ratio 1:1. The ratio for the next section down is 2:1, and for successive sections after that the ratios are 3:1, 2:1, 1:1, 1:2, 1:3, 1:2, and so on. The actual ratios, and the progressive variation along the overlap region, may of course be different, but as a general rule in embodiments of the invention it will be desirable to select the ratios so that the overlap region as a whole contains roughly equal contributions from I1 and I2 pixels. Further, where the sections are relatively large scale in comparison to the pixel size, and particularly where the sections are large enough to be resolved by the human eye, it will generally be desirable to vary the ratio gradually between successive sections to further reduce the visibility of the join line J.

Figure 4A:
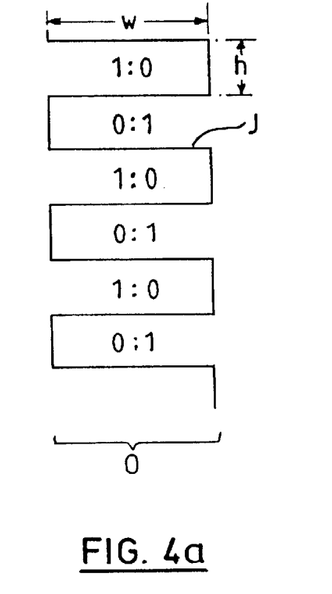
FIGS. 4a and 4b show a preferred technique for varying the proportional contributions along the overlap region.
Figure 4B:
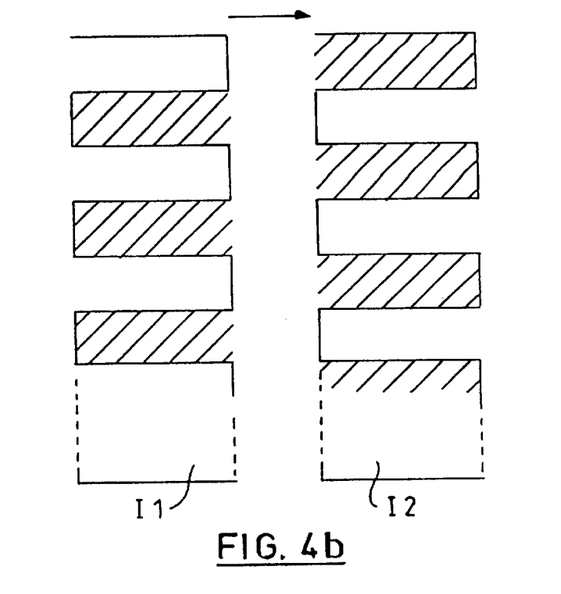

FIGS. 4a and 4b illustrate a particularly preferred method embodying the invention. Here the join line J is a rectangular waveform, which is a particularly simple waveform to implement in the processing operation, and the ratio of the proportions of I1 and I2 data is alternately 1:0 and 0:1 for successive sections along the length of the overlap region. Thus, the I3 pixels in each rectangular section are either wholly I1 pixels or wholly I2 pixels. In effect, therefore, as indicated by FIG. 4b, alternate sections of pixels (corresponding to the shaded sections in the figure) are simply eliminated in images I1 and I2, and the composite image I3 is then formed by 'fitting together' the modified I1 and I2 images. This type of method, where the ratio of I1:I2 data is either 1:0 or 0:1, allows the processing operation to be particularly simple, since floating point calculations to multiply pixel values are not required. Simplicity of operation is of course beneficial in many applications, but this type of method is particularly advantageous for real time processing of high resolution video where high processing speeds are required.

In the example of FIG. 4a, the width w of the overlap region and the thickness h of the sections can be varied in dependence on the particular application and the effect to be achieved. Where the overlap width can be selected at the time of image acquisition, a practical upper limit to the width will be determined by the acceptable loss of potential field of view since, clearly, the greater the overlap width w at the time of acquisition the less the overall width of the field of view. Whether or not the acquired overlap width can be influenced, the overlap width w in the images to be processed can be selected at less than the maximum available width simply by "trimming" the images along the overlapping edges. While reducing the overlap width can reduce the amount of data processing, the visibility of the join in the composite image tends to increase as the width of the overlap region decreases, since the separation of the pure I1 and I2 data in the composite image then decreases accordingly. Selection of the overlap width for the processing operation is therefore a matter of balancing the desire for a large field of view and minimal processing with the desire for a low visibility join, but as an example a typical value for the overlap width w might be 50 pixels. With regard to the thickness h of the sections, it will generally be preferred to set h low enough so that the individual sections cannot be resolved by the eye when the composite image is displayed. The overlap region will then appear to the viewer to be averaged out, even though no averaging calculations have been performed in the processing operation. The quality of the resulting image will be at least as good, in terms of low visibility of the join, as in a system which actually performed averaging of pixels in the overlap region. Depending on the resolution of the display system to be employed, h could be as small as one pixel, so that the overlap region in the composite image is made up of alternate lines of I1 and I2 pixels. However, to reduce processing it is preferred to set h to a value which is just less than can be resolved by the eye, so that for high resolution systems in particular h may be considerably greater than one pixel.

Figure 5A:
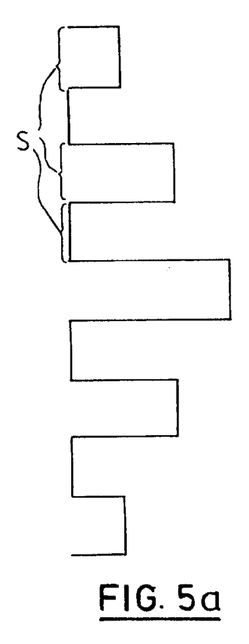
FIGS. 5a, 5b and 5c show variations of the technique of FIGS. 4a and 4b.
Figure 5B:
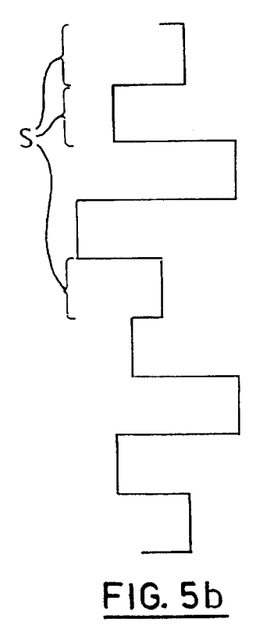
Figure 5C:
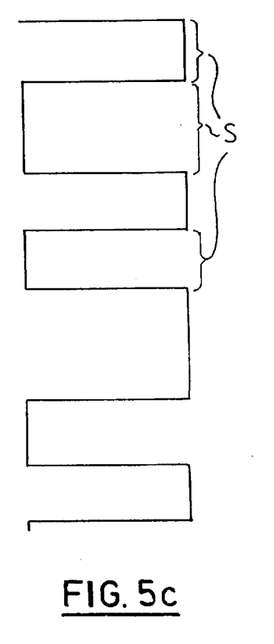

In the example of FIG. 4a, the section thickness h, and the amplitude of the rectangular waveform constituting the join line J, are constant. In other embodiments, one or both of these parameters may be varied along the overlap region. Examples of such methods are shown in FIGS. 5a to 5c. FIG. 5a, the amplitude of the rectangular waveform varies periodically along the overlap region, with the baseline corresponding to the left-hand boundary of the overlap region. In FIG. 5b, the amplitude of the waveform is varied in a random fashion about the longitudinal axis of the overlap region. The effect of the amplitude variation in these examples is to give the appearance of a gradual transition between I1 and I2 across the overlap region without the need for multiplication and summation of pixel values as in prior systems. In the examples of FIGS. 5a to 5c, the join line J can be considered to divide the overlap region into non-discrete sections S between adjacent horizontal segments of the waveform. In each section S, the image portion on the left of the line J is wholly I1 data, and the image portion on the right of the line is wholly I2 data, but it can be seen that the overall ratio of the proportions of I1 and I2 data in each section S varies between 1:0 and 0:1 for different sections along the length of the overlap region in dependence on the amplitude of the waveform J. FIG. 5c shows an alternative in which the thickness h of the sections S is varied along the length of the overlap region. Here, assuming section size is still less than the resolution of the eye, the effect will be a merging of the I1 and I2 data over the overlap region as before, but the band may appear less uniform, and so be less noticeable, in the composite image.

Figure 6:
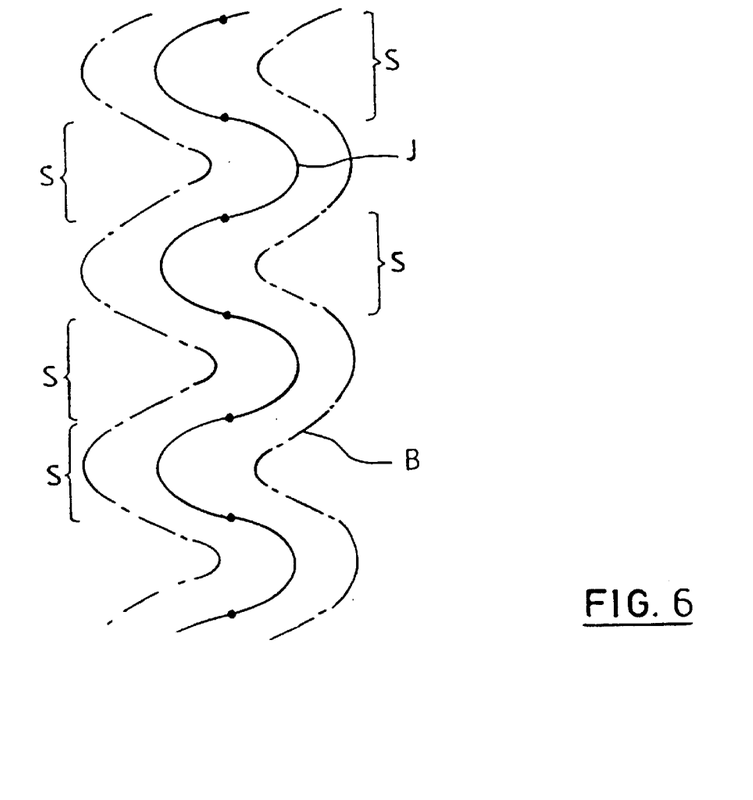
FIG. 6 is a schematic illustration of a technique in which combinational processing of data from the two images is implemented across a band of pixels axially disposed about a sinusoidal line.

As described above, in many applications it will be desirable for the size of the sections in the overlap region to be smaller than the eye can resolve. However, where simplicity of the processing operation is less important, this need not be the case, and FIG. 6 provides an example of such a method. Here, the line J is a sinusoidal waveform, and it is assumed that the waveform is on a scale such that the sections S of the overlap region between the crossover points of the waveform are of a size that can be resolved by the eye. If the line J simply divided pure I1 data from pure I2 data, the join line would be fairly noticeable (though not as noticeable as a straight line join). Thus, to reduce the visibility of the join, the individual I3 pixels in a band B of pixels axially disposed about the join line J are produced by combining proportions of the corresponding I1 and I2 pixels. (The band B of pixels is indicated by the dash-dotted lines in the figure). For example, a straightforward 1:1 combination of I1 and I2 pixels could be used in this region whereby the I1 and I2 data is averaged within the band. Alternatively, for example, a gradual transition could be effected if the ratio of the proportions of I1:I2 pixels used to produce the I3 pixels were varied linearly across the band. Of course, a more complex filtering process could be performed across the band, but in any case it will be seen that, because the band follows a non-straight line, the overall ratio of I1:I2 data in a section S of the overlap region is different for adjacent sections along the overlap region. Whichever process is used to produce the I3 pixels in the band, the join will be far less noticeable in the resulting image than if similar processing were performed over a straight-sided band.

Figure 7:
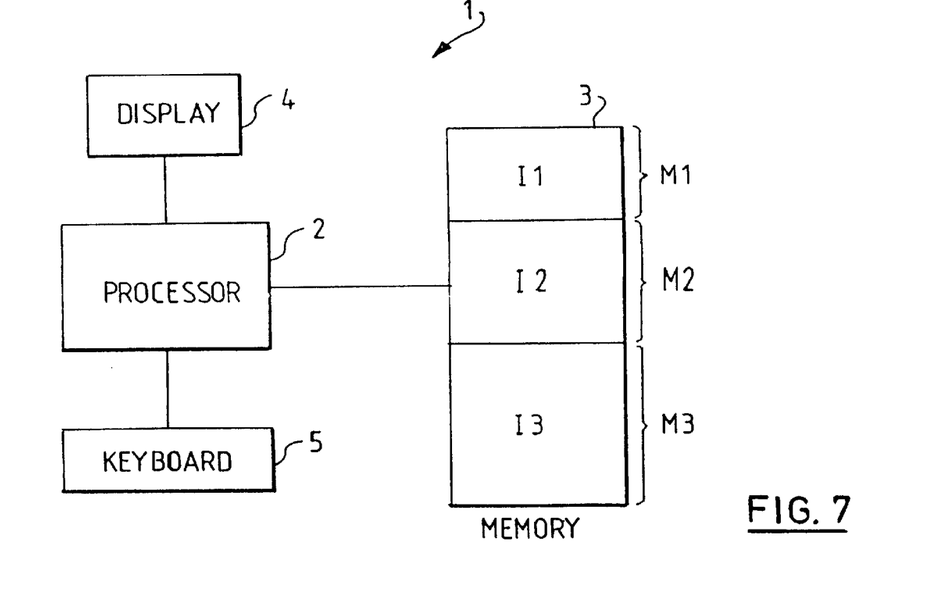
FIG. 7 is a simplified schematic of image processing apparatus embodying the invention.

FIG. 7 shows one example of processing apparatus embodying the invention for implementing one or more of the methods described above. The apparatus 1 includes processing means in the form of a processor 2 and a memory 3. A display 4 and user input means, in the form of a keyboard 5, are connected to the processor 2 as shown in the figure. The apparatus 1 can be embodied in a standard pc, the processor being programmed with software for controlling implementation of the various processing steps, and suitable software will be apparent to those skilled in the art from the description herein. In operation, the images I1 and I2 are supplied to an input (not shown) of the processing apparatus 1 and, under control of the processor 2, the images are stored in respective regions M1 and M2 of the memory 3. In this preferred embodiment, the user can then select, via keyboard 5, the settings for the various parameters defining the desired join method. Thus, the user can choose the desired form of join line J from a selection of available join lines such as those shown in FIGS. 2a to 2c and 5a to 5c. The user can also set the overlap width w, the section thickness h (or equivalent for non-rectangular waveforms), and the way in which the ratio of the proportions of I1:I2 data is to vary in relation to the line J, e.g. in accordance with one of the methods described above with reference to FIGS. 3 to 6. The processor 2 preferably prompts the user for the inputs required to define the processing operation by displaying instructions and/or a list of options on the display 4.

Once the parameters for the processing method have been set, the processor then determines how the individual pixels in the overlap regions of I1 and I2 need to be processed to obtain the I3 pixels in the overlap region in accordance with the particular join line and join method selected by the user.

As will be apparent from the foregoing description, for a given join method the way in which each I3 pixel is to be produced will depend on its location relative to the join line as determined by the processor 2. The processor then accesses the memory 3 to retrieve and process the data accordingly. In this embodiment, the composite image is to be mapped into the memory region M3. The processor 2 thus reads out the I1 and I2 data (on a pixel by pixel or a block basis as appropriate) and then, after performing any necessary processing, stores the data in the appropriate locations of the memory region M3. For methods such as those described with reference to FIGS. 4a to 5c, combinational processing of I1 and I2 pixels is not required, so the processor simply selects the appropriate I1 or I2 pixel to form each pixel in the overlap region of I3. In methods such as those of FIGS. 3 and 6, the processor generates the I3 pixels in the overlap region by selecting the appropriate I1 and I2 pixels from the memory 3, multiplying these pixel values by the required factors, and summing the resulting pixel values. At the end of this process, memory region M3 contains a map of the composite image, and the composite image data can then be read out for display to the user on the display 4.

In the above embodiment, a range of different processing method s can be implemented and the user can select the various parameters accordingly. In other embodiments, some or all of these parameters may be preset in the processor, in which case a smaller range of methods, or only a single processing method, may be available in the system.

Figure 8:
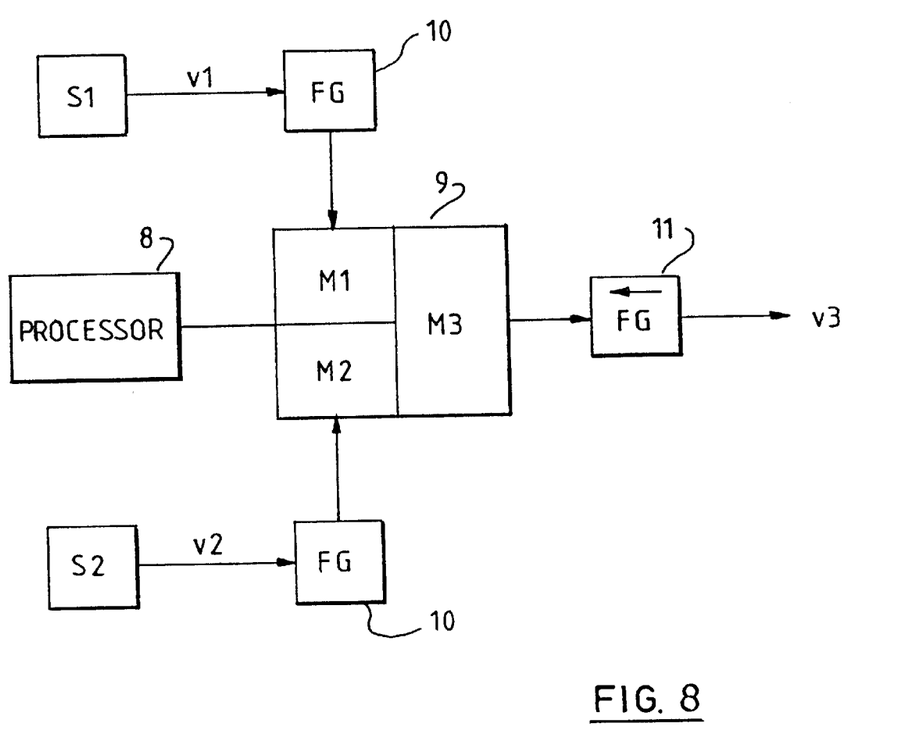
FIG. 8 illustrates an embodiment of the apparatus for real-time processing of video signals.

FIG. 8 shows an embodiment of processing apparatus for performing real-time processing of video signals by a method embodying the invention. Here, the apparatus includes a processor 8 and memory 9 which, like the corresponding elements of the processing means of FIG. 7, can be embodied in a suitably programmed pc. As indicated schematically in the figure, the memory 9 has three memory regions M1, M2 and M3 for storing I1, I2 and I3 image data respectively. Two video signals v1 and v2 are supplied to respective frame grabbers (FG) 10 from video sources S1 and S2 such as video cameras or reproducing devices for reproducing the video signals from recording media. Each frame grabber 10 outputs the frames of the video signal v1 or v2 to the memory 9 a complete frame at a time, each frame being output during the vertical blanking period after the complete frame has been received by the frame grabber. As each frame is supplied to the memory 9, the processor 8 controls storage of the frame in the appropriate section, M1 or M2, of the memory. While the following frames are being supplied to the frame grabbers 10, the processor 8 accesses the I1 and I2 data in memory regions M1 and M2 to generate the I3 data which is then stored in memory region M3. In this case, because the video signals v1 and v2 are to be processed in real time, processing speed must be high so the processor 8 implements a method such as those of FIGS. 4a to 5c. Thus, each I3 pixel is produced by selecting the corresponding I1 or I2 pixel as appropriate. As before, the set up parameters for the processing operation may be predefined in the processor 8, or may have been selected by the user via input means (not shown) prior to commencement of the processing operation, and the processor 8 generates the I3 data in accordance with these parameters.

Once the processing is complete, the memory region M3 stores a composite video frame which is then read out under processor control to an output frame grabber 11. This happens as the next pair of frames is input to the memory 9 from the input frame grabbers 10. The output frame grabber 11 may output successive received frames as a composite video signal v3 which can then be displayed directly or recorded for later display or further processing. For example, depending on the input video format and processing parameters such as the overlap width, the frame grabber 11 may output a wide screen format video signal which can be displayed directly as such. Alternatively, the frame grabber 11 may further process the received composite frames to output a video signal v3 in a desired format.

It will be seen that in the apparatus of FIG. 8, the processor 8 effectively processes the input video signals as a succession of still images, the processing speed being sufficiently high to allow this to be performed in real time. In this apparatus, a composite video image is mapped to memory region M3 in each frame period so that a composite video signal v3 is generated. However, embodiments can be envisaged in which I1 and I2 frames in memory regions M1 and M2 are processed as required but the modified I1 and I2 data is restored in regions M1 and M2. For example, for the processing method of FIG. 4a alternate sections of I1 and I2 pixels corresponding to the overlap region would simply be set to zero. After processing, the modified I1 and I2 frames together represent the image data for the composite image. Successive pairs of the modified I1 and I2 frames may then be read out to respective frame grabbers to generate a pair of modified video signals. These signals can be displayed together by a suitable display system, such as a pair of CRTs with overlapping scan areas on a single display screen, to display a single composite video image.

For ease of explanation, processing of the digital images has been described above as though each pixel is represented by a single digital value. In practice, the image data may be represented in a plural-channel signal format, such as the RGB, HSB or YCrCb system, where the complete image, and hence the constituent pixels, are defined by three component channels. It will be understood that these channels can be processed in parallel in embodiments of the invention. For example, in the apparatus of FIGS. 7 and 8, separate sets of memory regions M1 to M3 may be provided for each channel. While each channel may be processed in the same way in some embodiments, this need not be the case. For example, a processing method embodying the invention may be used only for the channel to which the human eye is most sensitive, such as the Y channel of the YCrCb system or the B channel of the HSB system. For the other channels a different technique may be used. For example, for these channels a simple straight-line join between I1 and I2 data may be implemented along the axis of the overlap region. Also, in the apparatus of FIG. 8, the frame grabbers 10, 11 may be of the type that can convert input video from one format to another. In this case, for example, input RGB format video may be optionally converted by frame grabbers 10 to YCrCb or HSB format video to allow different processing of the component channels. The frame grabbers 11 may then convert back to RGB if desired.

For simplicity, systems have been described herein in the context of joining two overlapping images, but the same principles can of course be applied in systems for joining more than two images, and in general a composite image may be formed from a two-dimensional array of component images. In such cases, each component image will overlap at least one other image and may overlap with other images along more than one of its edges. The principles described herein in relation to processing one pair of images can be readily applied to individual pairs of images in a larger array of component images, and suitable modifications to the apparatus of FIGS. 7 and 8 will be readily apparent to those skilled in the art. For example, in FIG. 7 additional memory regions can be provided for each component image, and the component images may be processed one pair at a time to generate the various sections of the composite image. In FIG. 8, again an additional memory region can be provided for each additional video signal, but in this case the processing is preferably performed in parallel to minimize processing time. In each case, where two overlap regions intersect in the composite image, one may be given priority in the composite image, or one pair of images may be processed first to generate one overlap region, the resulting data being used when processing the second pair of images to generate the second overlap region.

While preferred embodiments of the invention have been described above, it will be appreciated that many variations and modifications may be made to these embodiments without departing from the scope of the invention.

What is claimed is:

1. A method for processing digital image data representing first and second images with overlapping image content defining an overlap region including common image data content from each of the first and second images, to produce digital image data representing a composite image of the first and second images spanning the overlap region, the method comprising:

defining a waveform extending along a length of the overlap region for dividing the overlap region into sections on alternate sides of the waveform;

processing image data which corresponds to the overlap region in the first and second images to produce image data representing the overlap region in the composite image by reference to the waveform such that a ratio of proportions of image data of first and second images contributing to said overlap region in the composite image varies for different sections of the overlap region along the length of said overlap region, wherein the visibility of the waveform is reduced.

2. A method according to claim 1, wherein the ratio of the proportions of image data of first and second images contributing to the overlap region on one side of the waveform is 1:0 and the ratio of said proportions contributing to the overlap region on the other side of the waveform is 0:1.

3. A method according to claim 2, wherein said waveform is rectangular having amplitude which varies along the length of said overlap region.

4. A method according to claim 1, wherein said waveform divides the overlap region into discrete sections on alternate sides of said waveform along the length of the overlap region, and wherein said ratio of proportions is alternately 1:0 and 0:1 for successive sections along the overlap region.

5. A method according to claim 4, wherein said waveform is rectangular waveform, and wherein a thickness of said discrete sections varies along the length of the overlap region.

6. A method according to claim 1, wherein composite image pixels in a band of pixels axially disposed about said waveform are produced by combining proportions of first and second image pixels.

7. A method according to claim 1, wherein said waveform is rectangular.

8. A method according to claim 1, wherein said waveform is sinusoidal.

9. A method according to claim 1, wherein said waveform is sawtooth.

10. A method according to claim 1, wherein said digital image data comprises one of component data channels of a plural-channel digital image signal.

11. A method according to claim 10 wherein said digital image data comprises a channel representing luminance.

12. A method according to claim 1 wherein said first and second images correspond to frames of respective first and second video signals, successive pairs of first and second video frames being processed in real time to produce video data representing a composite video image.

13. A method for processing digital image data representing three or more images, each of the images having overlapping image content with at least one other of said images defining an overlap region including common image data content from each of the images with at least one other of said images, to produce digital image data representing a composite image of the three or more images spanning each overlap region, the method comprising:

for each pair of said images with overlapping image content: i) defining a waveform extending along a length of the overlap region for dividing the overlap region into sections on alternate sides of the waveform; and ii) processing image data which corresponds to the overlap region in said pair of images to produce image data representing said overlap region in the composite image by reference to the waveform such that a ratio of proportions of image data from the pair of images contributing to said overlap region in the composite image varies for different sections of the overlap region along the length of said overlap region, wherein the visibility of the waveform is reduced for each pair of said images.

14. Apparatus for processing digital image data representing first and second images with overlapping image content defining an overlap region including common image data content from each of the first and second images, to produce digital image data representing a composite image of the first and second images spanning the overlap region, the apparatus comprising:

a means for defining a waveform that extends along a length of the overlap region for dividing the overlap region into sections on alternate sides of the waveform;

processing means configured to process image data which corresponds to the overlap region in the first and second images to produce image data representing the overlap region in the composite image by reference to the waveform such that a ratio of proportions of image data of first and second images contributing to said overlap region in the composite image varies for different sections of the overlap region along the length of said overlap region, wherein the visibility of the waveform is reduced.

15. Apparatus according to claim 14, wherein said processing means comprises a memory for storing said digital image data, and a processor configured to control storage of the image data of first and second images in respective regions of said memory, to process the image data of first and second images to produce image data of the composite image, and to control storage of said image data of the composite image in a further region of said memory.

16. A computer for processing digital image data representing first and second images with overlapping image content defining an overlap region including common image data content from each of the first and second images, to produce digital image data representing a composite image of the first and second images spanning the overlap region, the computer comprising:

a memory for storing said digital image data;

a processor adapted to define a waveform extending along a length of the overlap region for dividing the overlap region into sections on alternate sides of the waveform; and said processor further configured to process image data which corresponds to the overlap region in the first and second images to produce image data representing the overlap region in the composite image by reference to the waveform such that a ratio of proportions of image data of first and second images contributing to said overlap region in the composite image varies for different sections of the overlap region along the length of said overlap region, wherein the visibility of the waveform is reduced.

17. A computer program product comprising a computer readable medium having recorded thereon a computer program which, when loaded in a computer, configures the computer for processing digital image data representing first and second images with overlapping image content defining an overlap region including common image data content from each of the first and second images, to produce digital image data representing a composite image of the first and second images spanning the overlap region, comprising:

defining a waveform extending along a length of the overlap region for dividing the overlap region into sections on alternate sides of the waveform; and processing image data which corresponds to the overlap region in the first and second images to produce image data representing the overlap region in the composite image by reference to the waveform such that a ratio of proportions of image data of first and second images contributing to said overlap region in the composite image varies for different sections of the overlap region along the length of said overlap region, wherein the visibility of the waveform is reduced.

* * * * *